United States Patent [19]
Imanishi

[11] Patent Number: 5,105,684
[45] Date of Patent: Apr. 21, 1992

[54] CRANK DRIVING DEVICE FOR PRESS

[75] Inventor: Shozo Imanishi, Sagamihara, Japan

[73] Assignee: Aida Engineering Ltd., Co., Sagamihara, Japan

[21] Appl. No.: 635,253

[22] Filed: Dec. 28, 1990

[30] Foreign Application Priority Data

Jan. 17, 1990 [JP] Japan .................... 2-7903

[51] Int. Cl.$^5$ .............................. B30B 1/26
[52] U.S. Cl. ...................... 74/600; 74/836; 74/44
[58] Field of Search ............ 74/600, 836, 44, 117, 74/571 M, 832, 833

[56] References Cited

U.S. PATENT DOCUMENTS

| 421,297 | 2/1890 | Mills | 74/571 M X |
| 892,623 | 7/1908 | Richards | 74/571 M X |
| 1,565,264 | 12/1925 | Dubi | 74/571 M |
| 4,031,778 | 6/1977 | Fazekas | 74/600 X |

FOREIGN PATENT DOCUMENTS 48-4356 2/1973 Japan .................... 74/571 M

Primary Examiner—Leslie A. Braun
Assistant Examiner—William O. Trousdell
Attorney, Agent, or Firm—Spencer, Frank & Schneider

[57] ABSTRACT

A crank driving device for a press designed in serial type eccentric structure. An eccentric element of crankshaft connected to a connecting rod, and an eccentric mechanism to provide a second eccentricity, are separated in the axial direction of the crankshaft. The opposite ends of crankshaft are provided, in respective eccentric holes in a pair of rotatable bodies which rotate synchronously on a basic axial line. The crankshaft is axially displaceable between a position in which it rotates in synchronism with the rotatable bodies and a position in which the crankshaft and the pair of rotatable bodies can be rotated relative to each other. The eccentricity of the device is adjusted by rotating crankshaft and pair of rotatable bodies, relative to each other, and then maintaining the relative angle of the crankshaft and the pair of rotatable bodies at constant value by connecting means after adjustment.

14 Claims, 3 Drawing Sheets

CRANK DRIVING DEVICE FOR PRESS

BACKGROUND OF THE INVENTION (1) Field of the Invention

The present invention relates to a crank driving device for a press.

(2) Description of the Prior Art

In general, press equipment is driven by a so-called crank device. Specifically, a crankshaft is rotatably supported on a machine body. The portion with larger diameter of the connecting rod is engaged with its eccentric element, and the portion with smaller diameter is connected to the slide. When the slide is movably guided along the machine upward and downward, the slide can be moved up or down by rotating the crankshaft through means commonly practiced.

If the upper die is placed face-to-face and fixed to the slide and the lower die to the bolster, which is a part of the machine, press operation can be achieved by a pair of these dies. The length of the stroke of upward and downward movements of the slide is twice as long as the eccentricity of the crank.

To obtain higher productivity, the rate of the strokes of the press should be increased. However, with this crank device the speed of the slide increase, and this leads to higher vibration and noise of the press. Also, the press operation itself is adversely affected as the so-called drawing speed is increased.

Because the average speed of the slide can be given by the product of the stroke length (S) and the number of revolutions per minute (N) of the crankshaft, which is the number of the strokes of press. Thus, the product SN is an important reference factor in designing a press. When the value of SN is constant, the relationship between the stroke length (S) and the number of revolutions (N) can be given as shown in FIG. 3.

It is evident from this figure that the stroke length (S) should be shortened for the purpose of increasing the number of revolutions (N). As the result, a structure providing variable stroke length (S) has been proposed in the past. This is illustrated in FIG. 4.

The center of the crank shaft 22 is at Om, and the eccentric element 23 is eccentric from Om by $e_1$. Eccentric ring 8 is engaged in the eccentric element 23. To the eccentric element 23, the eccentric ring 8 is eccentric by $e_2$. With the eccentric ring 8, the portion with larger diameter 5U of the connecting rod 5 is engaged. By rotating the eccentric ring 8 relative to the crankshaft 22, the relative eccentricity of the eccentric ring 8 to the center (Om) of the crankshaft 22 can be changed within the range of maximum value ($e_1 + e_2$) to minimum value ($e_1 - e_2$). Therefore, the maximum value for the stroke length is 2 ($e_1 + e_2$), and the minimum value is 2 ($e_1 - e_2$). Here, press machine is operated with the eccentric ring 8 fixed on the eccentric element 23 by means commonly known.

Examples of such mechanisms are described in Japanese Provisional Patent Publication No. 59-92200, Japanese Provisional Utility Model Publication No. 56-34698, West German Patent Publication No. 3112382.1-14,.

(3) Problems to be solved by the invention

Nevertheless, the conventional type multi-layer eccentric structure has the following problems:

(1) The eccentric ring 8 is engaged with the crank unit 23, and the upper end 5U (portion with larger diameter) of connecting rod 5 is engaged with it. Because press load is also applied on the eccentric ring 8, it must have considerable mechanical strength. Accordingly, the dimensions in the radial direction are too long, and this hinders a compact design of the press.

(2) The longer radial dimension of a multi-layer eccentric structure also directly leads to an increase of inertia. As the result, larger power transmission devices such as the main gear must be larger, and this decreases in turn the rotation control. Moreover, the upper end 5U of the connecting rod 5 has a larger diameter, and the peripheral speed is increased. This requires a more sturdy construction to cope with higher acceleration. On the other hand, this hinders high-speed operation of the machine.

(3) The multi-layer eccentric structure is accommodated in the so-called crown chamber of the press. Because of the recent increased requirements in the industry such as automation, diversification of the processes, etc., the crown chamber is more and more densely occupied. This imposes strong restrictions on a larger design of the press or on modifications of the device or its layout.

(4) The multi-layer eccentric structure requires an adjusting means, which adjusts the relative angle between the eccentric element 23 of the crankshaft 22 and the eccentric ring 8, and strictly maintains the relative angle once adjusted. This further aggravates the above problems (1)-(3). Making adjustment in a narrow crown chamber causes many difficulties and inconveniences, and the demands for high efficiency production of diversified products cannot be satisfied.

SUMMARY OF THE INVENTION (1) The object of the present invention is to offer a crank driving device for a press in a compact size and with less shock, by which it is possible to reduce the cost through simplification of the facilities and to produce high-precision products at high efficiency.

(2) Means to solve the problems

The above object can be attained by a serial type eccentric structure, in which the eccentric element of the crankshaft and the eccentric device which provides the second eccentricity are separated in the axial direction of the crankshaft.

Described in detail, the crank driving device for a press, according to the present invention, comprises:

a crankshaft with an eccentric element engaged with an upper end of a connecting rod, a pair of rotating bodies (rotatable bodies) supported synchronously and movably on basic axial line and having eccentric holes that are eccentric to the basic axial line, and connecting means;

characterized in that each end of the crank shaft is rotatably and displaceably engaged in axial direction in each of the eccentric holes of the rotatable bodies, and that said connecting means is arranged in such manner that relative rotation of crankshaft and rotatable bodies is allowed when the eccentricity of the eccentric element relative to the basic axial line is adjusted and relative angle between crank shaft and the rotatable bodies is maintained at a constant value after the eccentricity adjustment.

(3) Operation and effect

In the equipment according to the present invention, when the connecting means is kept in a locked state and the rotatable bodies are rotated around the basic axial line by a driving motor, the rotating force is transmitted to the crankshaft through the connecting means.

In this case, crank shaft makes eccentric movements because it is engaged in the eccentric holes of the rotatable bodies, and the connecting rod engaged with the eccentric element also makes eccentric movements around the axial line of the crankshaft. As a result, the connecting rod makes up and down strokes based on these eccentric movements.

If the stroke is to be decreased to perform shockless operation while maintaining SPM (stroke per minute) at a constant level and maintaining the productivity, the driving motor is stopped or braked to bring the rotatable bodies to a standstill. Then, the connecting means is released, and the connection between the rotatable bodies and the crank shaft is disengaged. By changing the relative angle between the rotatable bodies and the crank shaft, the overall eccentricity is adjusted.

When the connecting means is brought back into a locked state, the connecting rod, i.e. the slide, can be moved up and down by the overall eccentricity as adjusted.

The equipment according to the present invention is a serial-type crank driving device, which comprises a crankshaft, a pair of rotatable bodies having eccentric holes, and connecting means for connecting and separating the crankshaft and the rotatable bodies, and it is characterized in that the press speed is kept at a constant level by adjusting the eccentricity between the crank unit and eccentric hole and the slide stroke is adjusted as desired. Therefore, the disadvantages of the conventional type equipment, such as a large-size multi-layer eccentric structure, the difficult adjustment, excessive increase of peripheral speed, etc., are eliminated, and the conveniences permitting a compact design of the press and accurate and easy adjustment of the slide stroke are provided. As a result, the new equipment according to the present invention can meet the current requirements of the industry such as to provide an improvement in productivity, high-precision machining, production of diversified products and an increase in the number of automated processes.

Figure 1:
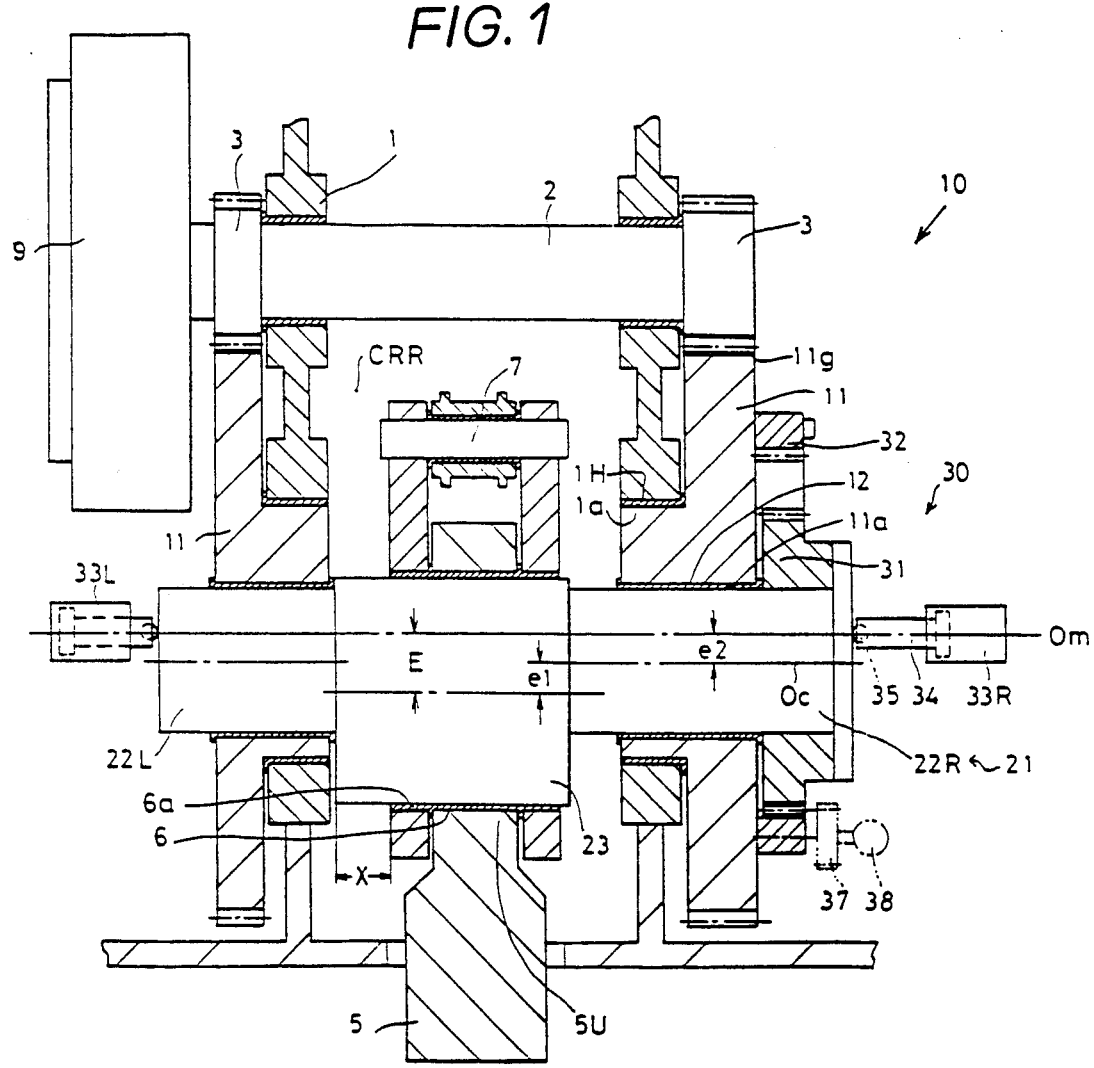
FIG. 1 is a cross-sectional view of an embodiment of the present invention.

In the FIGS. 1 represents a machine frame, 2 a pinion shaft, 5 a connecting rod, 5U an upper end of the connecting rod 5 10 a crank driving device, 11 a rotatable body, 12 an eccentric hole, 21 a crankshaft, 22L and 22R lateral ends, 23 an eccentric element, 30 connecting means, 31 a gear unit, 32 an internal gear, and 33L and 33R cylinders.

DETAILED DESCRIPTION OF THE PREFERRED EMBODIMENT

In the following, an embodiment of the present invention will be described in connection with the drawings.

As shown in FIG. 1, the crank driving device for a press 10 comprises a pair of rotatable bodies 11, a crankshaft 21 and connecting means 30, and it is designed in a new, serial type, eccentric structure in contrast to the conventional type, multi-layer eccentric structure.

In FIG. 1, 1 is a machine frame which forms a crown chamber CRR. 2 represents a pinion shaft provided with pinion gears 3 on both sides and rotatably supported on the machine frame 1.

The pinion shaft 2 is separably connected by a clutch-brake unit to a motor driven flywheel 9, rotated by a driving motor. These components make up a so-called prime mover mechanism.

The rotatable bodies 11 are rotatably supported in a hole 1H of the machine frame 1 around the basic axial line Om through bushes 11a and is provided with eccentric holes 12 with the eccentricity $e_2$. Gears 11g furnished on the outer periphery of bodies 11 are engaged with pinion gears 3. When the pinion shaft 2 is rotated, the pair of the rotatable bodies 11 provided on the left and right are synchronously rotated around basic axial line Om within the hole 1H. In this case, the eccentric hole 12 is eccentrically rotated with eccentricity $e_2$ around the basic axial line (axis) Om.

These rotatable bodies correspond to the main gears in the conventional type structure. Therefore, it is not related to large size facility.

The crank shaft 21 is provided with an eccentric element 23 with eccentricity $e_1$ relative to the crankshaft axial line (axis) Oc. In this eccentric element 23, the upper end 5U (with the hole 6) of the connecting rod 5 is engaged. When the crankshaft is rotated around the axial line Oc, the connecting rod 5 makes upward and downward movement based on the eccentricity $e_1$. This crankshaft 21 has the same structure as the crankshaft of the press, in which stroke adjustment by eccentric operation is not performed. Accordingly, a large-size facility is not involved.

The lateral ends 22R and 22L of the crankshaft 21 are rotatably and axially displaceably engaged in respective ones of the eccentric holes 12 of the rotating bodies 11 provided at the left and right, through the bushings 11a. The displacement tolerance X is as shown in FIG. 1. Namely, the eccentric element 23 is axially longer than the bushing 6a (connecting rod 5) with which it is slidably engaged.

A drive unit 7 is provided as a for dynamic balance weight for the slide.

The connecting means 30 is the means for selecting to have the rotatable bodies 11 and crankshaft 21 be rotatable synchronously or relatively. The connecting means 30 comprises an internal gear 32 fixed on the right rotatable body 11, a gear unit 31 concentrically fixed on the right lateral end 22R of the crankshaft 22, and a cylinder unit consisting of cylinders 33L and 33R (piston 34 and roller 35) for alternately pushing the shaft left and right respectively from the shaft end 22R and the shaft end. If the cylinder 33L is operated and the shaft end 22L is pushed rightward to permit an eccentricity adjustment (in the eccentricity $e_2$), internal gear 32 and gear unit 31 are disengaged, and this allows relative rotation of crankshaft 21 and rotatable bodies 11. On the other hand, if the cylinder 33R is operated instead of the cylinder 33L after the eccentricity adjustment, gear unit 31 is engaged with internal gear 32, thereby maintain the relative angle of the components 11 and 21 at a constant value. In FIG. 1, the number of teeth of internal gear 32 is more than that of the gear unit 31, whereas these may be equal to each other.

In this case, the relative rotation of the components 11 and 21 can be accomplished by various methods such as the method to fix the gear unit 31 (crankshaft 21) unrotatably after separating it from internal gear 32 and to rotate the rotatable bodies 11 only by a predetermined angle, or the method to rotate the adjusting gear 37 (shown by the two-dot chain line in FIG. 1) newly engaged with gear unit 31 after gear unit 31 is separated.

The upward and downward strokes of connecting rod 5 are determined by the overall eccentricity E ($e_1 \pm e_2$) to basic axial line Om. The adjustment in the overall eccentricity can be achieved with a resolution proportional to the number of teeth of the gear unit 31. The eccentricity $e_1$ is variable to the overall eccentricity E.

Because the connecting means 30 is provided on the right side, the rigidity (thickness) of the rotatable body 11 on the right side is higher than that of the left rotatable body.

Next, description is given of the operation of this embodiment.

In case it is desired to increase productivity by reducing the shock on dies and by increasing the SPM, or in case the slide speed is to be decreased by adapting the machining mode while maintaining SPM at a constant value, the stroke should be reduced.

Figure 2:
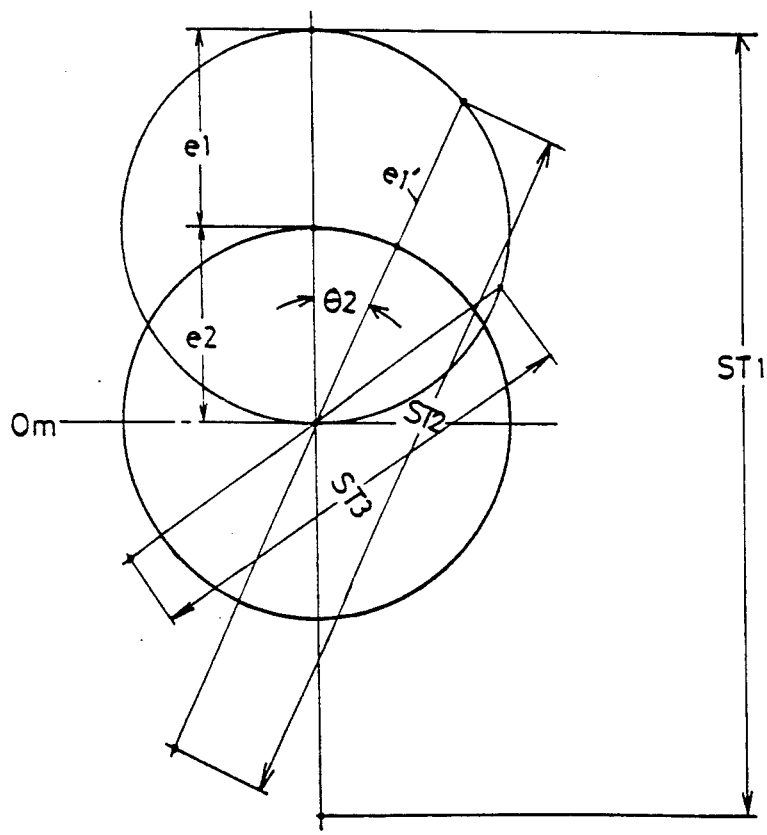
FIG. 2 is a drawing to explain the principle of eccentricity adjustment of the above equipment.
Figure 3:
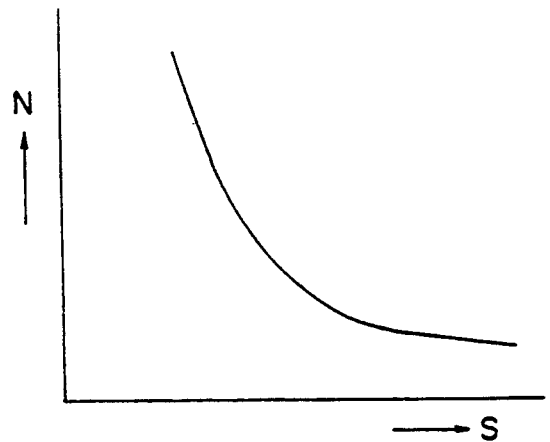
FIG. 3 shows the relationship between the stroke and the press speed.
Figure 4:
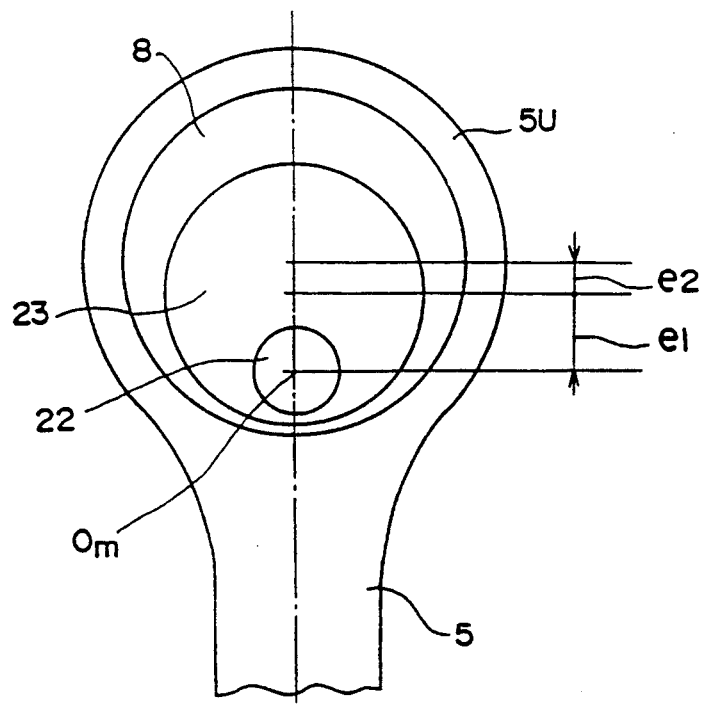
FIG. 4 is a schematical drawing of a conventional type crank driving device of multi-layer eccentric structure.

As shown in FIG. 2, in case the axial line Oc of the crankshaft 21 is engaged in the eccentric hole 12 with maximum eccentricity $e_2$ relative to the basic axial line Om, the stroke ST1 of the slide is twice as big as the overall eccentricity E ($e_1 + e_2$).

To adjust the slide stroke, the cylinder 33R of the connecting means 30 is released, and the cylinder 33L pushes. Then, the crankshaft 21 is displaced rightward in the eccentric holes 12 in FIG. 1. As a result, the gear unit 31 integrated with the crankshaft 21 is separated from the internal gear 32 integrated with the right rotatable bodies 11. In other words, the crankshaft 21 and the rotating body 11 can be rotated relative to each other.

When the rotatable bodies 11 are rotated to the right (left) by an angle $\theta_2$ as shown in FIG. 2, the axial line Oc of the crankshaft 21 apparently approaches the basic axial line Om. The overall eccentricity E' in this case is turned to the eccentricity $e_1'$ of the eccentric element 23 with apparently reduced eccentricity $e_2$, and the stroke is ST2.

When the connecting means 30 is operated again after the adjustment, i.e. when the cylinder 33L is released and the cylinder 33R pushes, the crankshaft 21 moves leftwards. Gear unit 32 engages with internal gear 32, and both components 11 and 21 are in a locked state.

Therefore, if pinion shaft 2 is rotated, and the rotatable bodies 11 as a main gear is rotated thereafter, a pressure operation can be performed with the stroke E' ($=e_1' + e_2$) after the adjustment.

As described above, the present embodiment comprises a crankshaft 21 provided with an eccentric element 23, a pair of rotatable bodies 11 having eccentric holes 12, and connecting means 30, and it is characterized in that the crankshaft 21 is engaged in the eccentric hole 12 so as to be relatively rotatable and axially displaceable, and that the connecting means 30 is designed in such manner that crankshaft 21 and rotatable bodies 11 can be released and locked. Therefore, a new crank driving device is offered, which is compact in size and is easy to handle and which overcomes the disadvantages of the prior art a requirement that it include a large-sized multi-layer eccentric structure, difficulty in making adjustments, and excessive peripheral speed.

The engagement of the crankshaft 21 and the connecting rod 5 is exactly the same as the structure of the so-called crank press, and the rotatable bodies are also designed as the so-called main gear in the conventional type equipment, and this contributes to a compact design of the equipment.

Because it is designed in a serial type, eccentric structure different from conventional multi-layer eccentric structures, the eccentricity E can be adjusted quickly and easily from either the side or outside of the crown chamber CRR.

Further, fine adjustment of the eccentricity E can be achieved according to the number of teeth of gear unit 31, which constitutes the connecting means 30, and this results in wide adaptability.

Because the eccentricity E is adjustable by displacing the crankshaft 21 in a lateral direction, the operation is easy to perform and can be easily automated.

What is claimed is:

1. A crank driving device for a press, comprising:
    a crankshaft with an eccentric element engaged with an upper end of a connecting rod, the crankshaft being rotatable on a crankshaft axis, a pair of rotatable bodies supported for synchronous rotation on a basic axial line and having eccentric holes which are eccentric to the basic axial line, and connecting means;
    characterized in that each end of said crankshaft is engaged in a respective one of the eccentric holes of said bodies, said crankshaft displaceable relative to said bodies along the crankshaft axis, and that said connecting means is arranged in such a manner that relative rotation of the crankshaft and the bodies is allowed when the eccentricity of the eccentric element relative to the basic axial line is adjusted and a relative angle between the crankshaft and the bodies is maintained at a constant value after said eccentricity is adjusted.

2. A crank driving device for a press according to claim 1, wherein said connecting means comprises an internal gear fixed on one of the bodies, an external gear fixed on one end of the crankshaft, and a cylinder unit to move the crankshaft along the crankshaft axis.

3. A crank driving device for a press according to claim 2, wherein the gear ratio of the internal gear and the external gear is 1:1.

4. A crank driving device for a press according to claim 3, wherein the rigidity of one of the bodies where said internal gear is fixed is higher than the rigidity of the other body.

5. A crank driving device for a press according to claim 1, wherein the axial dimension of the eccentric element exceeds the axial dimension of the upper end of the connecting rod.

6. A crank driving device according to claim 1, further comprising a machine frame supporting said bodies for rotation.

7. A crank driving device according to claim 1, wherein said crankshaft is axially movable between a first position in which said crankshaft is held by said connecting means against rotation relative to said bodies and a second position in which said crankshaft is rotatable relative to said bodies.

8. A crank driving device according to claim 1, wherein said crankshaft is axially movable with respect to said connecting rod.

9. A crank driving device, comprising:
    a frame;
    a pair of spaced apart bodies supported on said frame for rotation on a common first axis, each body having an eccentric hole, the holes having a common second axis spaced from and parallel to said first axis;

a crankshaft having opposite ends engaged in said holes, said crankshaft being axially reciprocally movable relative to said bodies between a first position and a second position, said crankshaft having an element mounted integrally therewith and axially spaced from said bodies, said element having a first eccentricity with respect to said first axis and a second eccentricity with respect to said second axis;

means for holding said crankshaft against rotation relative to said bodies when said crankshaft is in said first position, said crankshaft being rotatable relative to said bodies to adjust the first eccentricity when said crankshaft is in said second position;

means for rotating said bodies together with said crankshaft when said crankshaft is in said first position; and a rod having an end connected to said element so that when said bodies are rotated, said rod is reciprocated a distance proportional to the first eccentricity.

10. A crank driving device according to claim 9, wherein said crankshaft is axially movable with respect to said rod.

11. A crank driving device according to claim 9, wherein said holding means comprises:
   a first gear fixed on one of said bodies,
   a second gear fixed on the end of said shaft engaged in the hole of the one body, and
   means for moving said crankshaft between said first position and said second position to engage and disengage said first and second gears.

12. A crank driving device according to claim 11, wherein said first and second gears have a gear ratio equal to one.

13. A crank driving device according to claim 12, wherein the rigidity of said one body exceeds the rigidity of the other body.

14. A crank driving device according to claim 9, wherein said element has an axial dimension which exceeds the axial dimension of said upper end of said connecting rod.

* * * * *